US006174991B1

(12) United States Patent
Steiger

(10) Patent No.: US 6,174,991 B1
(45) Date of Patent: Jan. 16, 2001

(54) PROCESS FOR MAKING STABILIZED NON-COLORED RUBBER

(75) Inventor: Roland Steiger, Bright's Grove (CA)

(73) Assignee: Bayer Inc., Sarnia (CA)

(*) Notice: Under 35 U.S.C. 154(b), the term of this patent shall be extended for 0 days.

(21) Appl. No.: 09/331,927

(22) PCT Filed: Dec. 31, 1997

(86) PCT No.: PCT/CA97/00992

§ 371 Date: Jun. 29, 1999

§ 102(e) Date: Jun. 29, 1999

(87) PCT Pub. No.: WO98/29457

PCT Pub. Date: Jul. 9, 1998

(30) Foreign Application Priority Data

Dec. 31, 1996 (CA) .................................................. 2194210

(51) Int. Cl.⁷ ...................................................... C08C 2/04
(52) U.S. Cl. .......................... 528/486; 528/491; 528/499; 523/328; 523/332; 523/335
(58) Field of Search ................................... 523/326, 328; 524/291, 114; 525/354, 385; 528/386, 486, 487, 491, 499; 526/84

(56) References Cited

U.S. PATENT DOCUMENTS 3,658,743 * 4/1972 Bevilacqua ......................... 260/23.5

4,360,643 * 11/1982 Naylor ................................ 525/386

FOREIGN PATENT DOCUMENTS

090163 * 10/1983 (EP) ................................. C08C/2/00

* cited by examiner

*Primary Examiner*—Edward J. Cain
*Assistant Examiner*—Katarzyna Wyrozebski
(74) *Attorney, Agent, or Firm*—Joseph C. Gil; Noland J. Cheung

(57) ABSTRACT

A process for the recovery of an initially living polymer from a cement produced in a polymerization process. The living polymer cement is shortstopped, washed, stabilised, coagulated and dried. The recovery process comprises adding a short stop to the polymer in the cement, washing catalyst residue from the polymer with water, adding an antioxidant Irganox 1520 to the cement to stabilise the polymer, adding epoxidised soya bean oil to the polymer to stabilise the polymer against colour degradation, and coagulating and drying the polymer. The pH of the cement is regulated in the range of from about 3 to about 7, and preferably from about 6 to about 7, during the catalyst wash and the coagulation steps of the recovery process. A product of the process is also described. The product and process provide for use of a preferred anti-oxidant system, which overcomes health concerns associated with existing anti-oxidant systems used in anionic polymerization processes, while providing a polymer product that has excellent colour and stability characteristics suitable for use in high impact polystyrene applications.

22 Claims, No Drawings

PROCESS FOR MAKING STABILIZED NON-COLORED RUBBER

TECHNICAL FIELD

This invention relates to a process for making stabilised, non-coloured polymer products of anionic polymerisation. In particular, this invention relates to a process for making stabilised, non-coloured rubber by using epoxidised soya bean oil and neodecanoic acid during the polymer recovery process.

BACKGROUND ART

Polymerisation processes for the manufacture of polymer products of anionic polymerisation, such as lithium butadiene rubber, styrene-butadiene rubber and butadiene-styrene-isoprene rubber are well known. It is also well known that stabilisers, such as antioxidants, may be added to the polymer cement following polymerisation to reduce the natural degradation and resulting discolouration of the polymer. The desire to sustain colourless product is particularly important to butadiene rubber or styrene-butadiene rubber in HIPS (high impact polystyrene) applications. A commonly used antioxidant system in the manufacture of lithium-butadiene rubber, for example, is tris(nonylphenol) phosphite (TNPP) in combination with phenolic antioxidants, such as Irganox 1076. However, as part of efforts to improve the manufacturing processes to reduce or eliminate health hazardous materials, alternative antioxidant systems are being sought and tested. It is known that Irganox 1520, a hindered phenol, provides desirable properties in the polymer and reduces degradation to a degree comparable to current antioxidant systems. However, it has been recognized in the past (U.S. Pat. No. 3,658,743) that hindered phenols used as antioxidant may cause discolouration. Byproducts of low purity Irganox 1520 can form colour bodies during the recovery process, which can result in a coloured rubber product. Polymer treated and recovered using low purity grades of Irganox 1520 alone does not provide a product which remains colourless after thermal aging (herein referred to as "sustained colourlessness").

Iganox 1520 is available in three grades, which differ in degree of purity. Energy consuming distillation is used to purify or reduce impurities in the crude Irganox 1520 product to remove higher and lower boiling byproducts. A product with a relatively lower proportion of byproducts (such as odour causing mercaptans) was available as Irganox 1520 L grade. A product with relatively higher proportion of byproducts has been offered as Irganox 1520 D and may be further purified to produce Irganox 1520 L. The Irganox 1520 L grade is additionally reacted with epoxidised soya bean oil for further removal of byproducts such as mercaptans to reduce odour. This product is available as Irganox 1520 LR grade.

DISCLOSURE OF THE INVENTION

We have found an improved polymer recovery process which will produce a sustained colourless polymer product of anionic polymerisation, such as polybutadiene polymer, solution butadiene-styrene copolymer, or butadiene-styrene-isoprene copolymer. The recovered polymer has the preferred physical characteristics of known polymers, is stabilised against degradation including discolouration, in accordance with industry and commercially preferred standards.

In the preferred process for the recovery of a polymer from a cement produced in a lithium alkyl initiated polymerisation process, the polymer cement is shortstopped, washed, stabilised, coagulated, stripped and dried. The recovery comprises adding a short stop to the polymer in the cement, washing catalyst residue from the polymer with water, adding an antioxidant Irganox 1520 to the cement to stabilise the polymer, adding epoxidised soya bean oil to the polymer to stabilise the polymer against colour degradation, coagulating, stripping and drying the polymer. The pH of the cement is regulated in the range of from about 3 to about 7, or preferably from about 6 to about 7, during the catalyst wash and the coagulation steps of the recovery process. In an alternative process, instead of adding the epoxidised soya bean oil to the polymer cement, the epoxidised soy bean oil may be reacted with the Irganox 1520 before adding to the polymer cement.

A product of an anionic polymerisation process is also provided. The polymer is removed from the product of the polymerisation process by a recovery process with a short stop addition step, a catalyst wash step, an antioxidant addition step, a coagulation and a stripping step. The pH is controlled in the range of from about 3 to about 7 and preferably from about 6 to about 7 during the catalyst wash step and the coagulation step. The shortstop step is the addition of an organic acid of formula R—COOH, where R is an organic moiety, and preferably a $C_3$–$C_{30}$, more preferably a $C_3$–$C_{20}$ and most preferably a $C_3$–$C_{15}$. The preferred short stop is neodecanoic acid. The anti-oxidant is Irganox 1520 and epoxidised soya bean oil, the Irganox 1520 containing byproducts that have not been removed and that without the addition of epoxidised soya bean oil would produce a coloured polymer product. The Irganox 1520 is available in different grades of purity. It should be noted that impurities are removed by the manufacturer, and "removal" or "removed" in relation to the impurities in Irganox 1520 herein is intended to mean reduced levels of by-products or impurities and not necessarily a product from which all by-products or impurities have been removed.

The polymer recovered according to the recovery process of the invention is substantially colourless and maintains a colourless state after thermal aging for an acceptable polymer shelf life. A sustained colourless product in the context of the invention has stability and shelf life including colourlessness after thermal aging comparable to the colourlessness achieved for polybutadiene polymer recovered using the currently preferred Irganox 1076 (hindered phenolic stabiliser of Ciba Geigy) and TNPP tris(nonylphenyl) phosphite system. The process will be described with reference to the lithium butadiene polymerisation process and the solution styrene/butadiene polymerisation process, although it is not intended to restrict the invention to recovery of polymer from these processes.

The polymer cement produced by anionic polymerisation, such as in the lithium butadiene polymerisation process or in the solution styrene-butadiene polymerisation process contains initially a "living" polymer. A short stop is added to the living polymer cement to stop the polymerisation process.

The preferred short stop is neodecanoic acid to an amount of greater than or equal to the molar amount of lithium initiator used for the polymerisation. The molar ratio of neodecanoic acid to lithium is preferably 1.5.

A catalyst washing and neutralisation step is conducted to wash the lithium residues from the polymer. This step is performed by (1) the addition of 5–100 wt. % (relative to the cement) of demineralised water, (2) intensive mixing and (3) the addition of a water soluble acid, of which non-limiting examples are $H_2SO_4$, HCl or, preferably, citric acid. The amount of acid added is selected according to the pH in order to keep the catalyst washing step in a slightly acidic to neutral environment at a pH in the range of from about 3 to about 7 and preferably from about 6 to about 7. The molar amount of HCl is 1–1.5 times the molar amount of lithium initiator being used for the polymerisation, the molar amount of $H_2SO_4$ is 0.5–0.75 times the molar amount of lithium initiator, the molar amount of citric acid is 0.3–0.5 times the molar amount of lithium initiator. In step (1), alternatively, the addition of demineralised water may be in the range of 5–50 wt. %, or 5–25 wt. % (relative to the cement).

The antioxidant addition consists of adding any Irganox 1520 grade and epoxidised soya bean oil to the polymer:

Irganox 1520 D or commercially available Irganox 1520 L plus, for example, about 200 wt. % epoxidised soya bean oil (relative to the anti-oxidant) may be added to the polymer cement. The epoxidised soya bean oil may be added as a blend together with the Irganox 1520 D or Irganox 1520 L or separately. The amount of epoxidised soya bean oil required will vary according to the anti-oxidant selected;

Also the Irganox 1520 D or Irganox 1520 L may be prereacted with about 4% epoxidised soya bean oil and the unpurified reaction product may be added to the polymer cement. The amount of epoxidised soya bean oil required will vary according to the antioxidant selected;

Also commercially available Irganox 1520 LR may be added to the polymer cement. Irganox 1520 LR contains residual amounts of epoxidised soya bean oil.

The polymer is coagulated. The pH during coagulation and stripping is closely controlled. If required, in order to keep the pH between 3 to 7, or the preferred range of 6 to 7, additional acid such as $H_2SO_4$, HCl or, preferably, citric acid may be added.

The coagulated polymer is stripped to remove unconverted monomer and residual solvent. If required, in order to keep the pH between 3 and 7, or the preferred range of 6 to 7, additional acid such as $H_2SO_4$, HCl or preferably citric acid may be added. The stripped polymer is dried under heat and air.

The process of the invention is used for the manufacture of polymer, such as polybutadiene rubber, or solution stryrene-butadiene rubber, to provide a colourless product for use in applications where sustained colourlessness is required, such as in applications in high impact polystyrene.

One advantage of the invention is the discovery of a process for using a hindered phenolic stabiliser with neodecanoic acid and other stated elements of the recovery system to provide a sustained colourless product comparable to current products produced using Irganox 1076 and TNPP, while avoiding use of TNPP. The benefit of epoxidised soya bean oil use is particularly apparent from the ability to use the epoxidised soya bean oil in conjunction with low purity grade Irganox 1520 which is less expensive to produce than grades of higher purification, such as Irganox 1520 L and Irganox 1520 LR.

The following examples are intended to illustrate the process and benefits according to the invention without limiting it in any way:

EXAMPLES

Example 1 (Prior Art)

This Experiment is provided as a comparative example following a prior art method using Irganox 1076/TNPP as the antioxidant system for production of lithium-butadiene rubber. A polymerisation of 85 g of butadiene 1.3 in 415 g of dry n-hexane was started by the addition of a solution of 0.4 mmoles of butyllithium in 5 g of n-hexane. The reaction was carried out in a 1.5 l gas tight reaction vessel under inert gas atmosphere for 3 h, 70° C. under permanent shaking.

The living polymer cement was shortstopped by the addition of 10 ml EtOH. A mixture of Irganox 1076 and TNPP was mixed into the cement. A steam coagulation was carried out for 1 hour at 100° C. The wet and white polymer was recovered and dried on a mill. The dry rubber shows a crystal clear colour (colour 0). After aging for 7 days at 70° C. in an oven the product colour remains unchanged (colour 0). The materials and results are shown in Table 1.

Example 2

A polymerisation of 85 g of butadiene 1.3 in 415 g of dry n-hexane was started by the addition of a solution of 0.4 mmoles of butyllithium in 5 g of n-hexane. The reaction was carried out in a 1.5 l gas tight reaction vessel under inert gas atmosphere for 3 h, 70° C. under permanent shaking.

The living polymer cement was shortstopped by the addition of 0.6 mmoles of neodecanoic acid followed by the addition of 0.2 mmoles citric acid. The shortstopped polymer cement was poured into an open beaker containing 300 g of demineralised water and intensively agitated. The pH was measured frequently and additional citric acid was added if the pH exceeded 7. The water was drained off. A steam coagulation was carried out for about 1 hour at 100 C. During this process step, the pH was measured frequently and citric acid was added if the pH exceeded 7. The wet polymer was recovered and dried on a mill. Colour was measured on a relative scale in comparison to desired colour properties for HIPS applications. Haake stability was also measured. The materials and results are recorded in Table 2.

As shown in Table 2, the experiments vary according to the antioxidant system used. In Experiment 2-1, 2-2, and 2-3, Irganox 1520 D, Irganox 1520 L and Irganox 1520 LR were used, respectively. In Experiment 2-4 a mixture of 10 g of the Irganox 1520 D and 0.4 g of epoxidised soya bean oil is prereacted for 1 h at 120° C. in an open vessel under frequent shaking. 0.069 g (0.09 phr) of the nonpurified reaction product dissolved in 10 ml of dry n-hexane is mixed into the washed cement. 300 ml of deionised water is added to the stabilised polymer cement and a steam coagulation is carried out for 1 h at 100° C. The wet and pure white polymer is then recovered and dried on a mill for 3 minutes at 100° C. The dry rubber (<0.5% volatiles) shows a crystal clear colour (colour 0). After aging for 7 days at 70° C. in an oven the product colour remains unchanged.

Experiment 2-5 was conducted in accordance with Experiment 2-4 procedure, except that Irganox 1520 L was used in place of Irganox 1520 D.

In Experiment 2-6, 0.069 g of Irganox 1520 D was dissolved in 10 ml of n-hexane and mixed into the washed cement, after which 140 mg epoxidised soya bean oil was mixed into the washed cement. The remaining steps were according to Experiment 2-1 procedure.

Experiment 2-7 was conducted in accordance with Experiment 2-6 procedure, except that Irganox 1520 L was used in place of Irganox 1520 D.

The materials and results of the seven experiments in Example 2, including colour measurements, are shown in Table 2. The results indicate that product with good colour and stability was produced in Experiments 2-3 to 2-7. The polymer product of Experiments 2-1 and 2-2, which used low grades of Irganox 1520 as anti-oxidant, without epoxidised soya bean oil in the Irganox 1520 or added to the Irganox 1520 or added to the cement, had poor colour characteristics. The colour measurements are shown in Table 2.

Example 3

The experiments in Example 3 followed the procedure of Experiment 4 of Example 2. In Experiment 3-1 the catalyst wash step is skipped, and 0.4 mmole citric acid is added during the coagulation step to control pH. Experiment 3-2 was conducted substantially in accordance with the Experiment 2-4 procedure. The materials and results of the experiments, including colour measurement, are shown in Table 3. The results of Experiment 3-1 indicate that a process that eliminates the catalyst wash step produces a product with colour after aging.

Example 4

This example illustrates the process without pH control. In Experiment 4-1, the short stop step includes addition of 0.6 mmole neodecanoic acid, and there is no use of citric acid in the catalyst wash or coagulation steps to control pH. The antioxidant system used is Irganox 1520 D prereacted with epoxidised soya bean oil, in accordance with the procedure used in Experiment 2-4. In Experiment 4-2, water is used as a short stop, and again there is no effort to control pH in the catalyst wash or coagulation steps. The materials and results are shown in Table 4. Both processes produce coloured product. In Experiment 4-1 the product is coloured after aging, and in Experiment 4-2, the product is coloured initially and after aging.

Example 5

This example illustrates the process without neodecanoic acid as the short stop. The experiment followed the procedure of Experiment 2-4 with the exception that citric acid was used as a short stop in place of neodecanoic acid. The materials and results are shown in Table 5. The process produced a product with good colour initially, but which coloured after aging.

Example 6

This example illustrates the process without addition of anti-oxidant. The experiment followed the procedure of Experiment 2, except that no anti-oxidant was added. The materials and results are shown in Table 6. The process produced a product that had good colour initially and after aging.

Example 7

The experiment in Example 3 was conducted substantially in accordance with the Experiment 2-4 procedure. The materials and results of the experiment, including colour measurement, is shown in Table 7. The results of Experiment 7 indicate that $H_2SO_4$ is a suitable acid for use in regulating pH in the catalyst wash step and that good product colour is achieved when pH is in the range of 3.1

It will be understood that the specification and examples are illustrative but not limitative of the present invention and that other embodiments within the spirit and scope of the invention will suggest themselves to those skilled in the art.

TABLE 1

Example 1

| No. | BuLi mmole | 1st addition mmole | 2nd addition | H+ mmole | pH | 3rd addition | found AO % | CA addition coag | pH in coag start | pH in coag end | col. 1 | col. 2 aged rub. | Haake Stab. min. |
|---|---|---|---|---|---|---|---|---|---|---|---|---|---|
| | | SS | CW/NEU | | | | AO | | coag | | | | |
| 1 | 0.4 | 10 ml EtOH | — — | — | — | 1076/TNP | | steam | — | — | 8.5 | 8.5 | 0 | 0 | 6 |

VA = neodecanoic acid
CA = citric
ESBO = epoxidised soya bean oil

TABLE 2

Example 2 (1 h md. 70° C. after each addition, good cat. was, check on different 1520 grades)

| No. | BuLi mmole | 1st addition mmole | 2nd addition | H+ mmole | pH | 3rd addition | found AO % | CA addition coag | pH in coag start | pH in coag end | col. 1 | col. 2 aged rub. | Haake Stab. min |
|---|---|---|---|---|---|---|---|---|---|---|---|---|---|
| | | SS | CW/NEU | | | AO | | | coag | | | | |
| 1 | 0.4 | 0.6 mmole VA | 0.20 mmole CA | >0.6 | 6–7 | 0.09 phr 1 1520 D | 0.08 | steam | — | — | 6–7 | 1 | 2 | 7 |
| 2 | 0.4 | 0.6 mmole VA | 0.20 mmole CA | >0.6 | 6–7 | 0.09 phr 1 1520 L | 0.10 | steam | — | — | 6–7 | 0 | 1–2 | 8 |
| 3 | 0.4 | 0.6 mmole VA | 0.20 mmole CA | >0.6 | 6–7 | 0.09 phr 1 1520 LR | 0.10 | steam | — | — | 6–7 | 0 | 0 | 7 |
| 4 | 0.4 | 0.6 mmole VA | 0.20 mmole CA | >0.6 | 6–7 | 0.09 phr 1520 D (preheat with 4% ESBO) | 0.08 | steam | — | — | 6–7 | 0 | 0 | 7 |

TABLE 2-continued

Example 2 (1 h md. 70° C. after each addition, good cat. was, check on different 1520 grades)

| No. | BuLi mmole | 1st addition mmole | 2nd addition | H+ mmole | pH | 3rd addition | found AO % | coag | CA addition mmole | pH in coag start | pH in coag end | col. 1 | col. 2 aged rub. | Haake Stab. min |
|---|---|---|---|---|---|---|---|---|---|---|---|---|---|---|
| 5 | 0.4 | 0.6 mmole VA | 0.20 mmole CA | >0.6 | 6–7 | 0.09 phr 1520 L (preheat with 4% ESBO) | 0.09 | steam | — | — | — | 6–7 | 0 | 0 | 8 |
| 6 | 0.4 | 0.6 mmole VA | 0.20 mmole CA | >0.6 | 6–7 | 0.09 phr 1520 D + 14 mg ESBO (blend) | 0.10 | steam | — | — | — | 6–7 | 0 | 0 | 9 |
| 7 | 0.4 | 0.6 mmole VA | 0.20 mmole CA | >0.6 | 6–7 | 0.09 phr 1520 L + 140 mg ESBO (blend) | 0.07 | steam | — | — | — | 6–7 | 0 | 0 | 7 |

VA = neodecanoic acid
CA = citric
ESBO = epoxidised soya bean oil

TABLE 3

Example 3 (good mixing for 0.5 h at 70° C., separate steps, no cat. wash)

| No. | BuLi mmole | 1st addition mmole | 2nd addition | H+ mmole | pH | 3rd addition | found AO % | coag | CA addition mmole | pH in coag start | pH in coag end | col. 1 | col. 2 aged rub. | Haake Stab. min |
|---|---|---|---|---|---|---|---|---|---|---|---|---|---|---|
|  |  | SS | CW/NEU |  |  | AO |  | coag |  |  |  |  |  |  |
| 1 | 0.4 | 0.6 mmole VA 0.20 mmole CA | (skipped) | >0.6 | — | 0.09 phr 1520 D (preheat with 4% ESBO) | 0.07 | steam | 0.04 CA | 6.2 | 6.9 | 0 | 1 | 6 |
| 2 | 0.4 | 0.6 VA | 0.20 mmole CA | >0.6 | 6.1 | 0.09 phr 1520 D (preheat with 4% ESBO) | 0.10 | steam | — | 6.1 | 6.5 | 0 | 0 | 7 |

VA = neodecanoic acid
CA = citric
ESBO = epoxidised soya bean oil

TABLE 4

Example 4 (good mbdng for 0.5 h at 70 C., separate steps, no pH control)

| No. | BuLi mmole | 1st addition mmole | 2nd addition | H+ mmole | pH | 3rd addition | found AO % | coag | CA addition mmole | pH in coag start | pH in coag end | col. 1 | col. 2 aged rub. | Haake Stab. min |
|---|---|---|---|---|---|---|---|---|---|---|---|---|---|---|
|  |  | SS | CW/NEU |  |  | AO |  | coag |  |  |  |  |  |  |
| 1 | 0.4 | 0.6 VA | — | — | 7.7 | 0.09 phr 1520 D (preheat with 4% ESBO) | 0.08 | steam | — | — | 7.7 | 8.2 | 0 | 1–2 | 6 |
| 2 | 0.4 | 10 ml H$_2$O | — | — | 8 | 0.09 phr 1520 D (preheat with 4% ESBO) | 0.07 | steam | — | — | 8.1 | 8.2 | 1 | 2 | 5 |

VA = neodecanoic acid
CA = citric
ESBO = epoxidised soya bean oil

TABLE 5

Example 5 (good mixing for 0.5 h at 70° C., separate steps, ESBO prereaction, no VA)

| No. | BuLi mmole | 1st addition mmole | 2nd addition | | | H+ mmole | pH | found AO % | coag | CA addition mmole | pH in coag start | pH in coag end | col. 2 col. 1 | Haake aged rub. | Stab. min |
|---|---|---|---|---|---|---|---|---|---|---|---|---|---|---|---|
| | | SS | AO | | CW/NEU | | | | coag | | | | | | |
| 1 | 0.4 | 0.4 CA | 0.09 phr | 1 1520 D + ESBO prereacted | | 1.2 | 3.1 | 0.05 | steam | — | — | 3.1 | 3.5 | 0 | 1 | 11 |

VA = neodecanoic acid
CA = citric
ESBO = epoxidised soya bean oil

TABLE 6

Example 6 (good mixing for 0.5 h at 70° C., separate steps, no AO)

| No. | BuLi mmole | 1st addition mmole | 2nd addition | H+ mmole | pH | 3rd addition mmole | found AO % | coag | CA addition mmole | pH in coag start | pH in coag end | col. 2 col. 1 | Haake aged rub. | Stab. min |
|---|---|---|---|---|---|---|---|---|---|---|---|---|---|---|
| | | SS | CW/NEU | | | AO | | coag | | | | | | |
| 1 | 0.4 | 0.6 mmole VA | 0.20 mmole CA | >0.6 | | — | — | — | steam | — | — | 6.2 | 6.5 | 0 | 0 | 7 |

VA = neodecanoic acid
CA = citric
ESBO = epoxidised soya bean oil

TABLE 7

Example 7

| No. | BuLi mmole | 1st addition mmole | 2nd addition | H+ mmole | pH | 3rd addition | found AO % | coag | CA addition mmole | pH in coag start | pH in coag end | col. 2 col. 1 | Haake aged rub. | Stab. min |
|---|---|---|---|---|---|---|---|---|---|---|---|---|---|---|
| | | SS | CW/NEU | | | AO | | coag | | | | | | |
| 1 | 0.4 | 0.6 VA | 0.4 mmole CA | >>0.6 | 3.1 | 0.09 phr 1520 D (preheat with 4% ESBO) | 0.09 | steam | — | — | 3.1 | 3.1 | 0 | 0 | 8.0 |

VA = neodecanoic acid
CA = citric
ESBO = epoxidised soya bean oil

What is claimed is:

1. A process for the recovery of a living polymer from a cement produced in a polymerization process wherein, the living polymer cement is shortstopped, washed, stabilized, coagulated, stripped and dried, characterized in that the recovery comprises:
    adding a short stop to said polymer in said cement,
    washing catalyst residue from said polymer with water in an amount of 5–100 wt. % by weight of the cement,
    adding a hindered phenol to said cement to stabilize said polymer,
    adding epoxidized soya bean oil to said polymer to stabilize the polymer against color degradation,
    coagulating and stripping said polymer,
    regulating the pH of the cement in the range of from about 3 to about 7, during the catalyst wash and the coagulation steps of the recovery process.

2. The recovery process of claim 1 wherein the epoxidised soya bean oil is added to a hindered phenol from which byproducts have not been removed by purification using epoxidised soya bean oil, and wherein said epoxidised soya bean oil and hindered phenol are mixed and heated at a temperature of up to about 120 C. for at least about 1 hour prior to addition to said polymer in cement.

3. The recovery process of claim 2 wherein the epoxidised soya bean oil is added to a hindered phenol from which byproducts have not been removed by purification using epoxidised soya bean oil, and wherein said epoxidised soya bean oil and hindered phenol are blended together prior to addition to said polymer in cement.

4. The recovery process of claim 1 wherein the short stop is an organic acid of the formula R—COOH, where R is an organic moiety.

5. The recovery process of claim 1 wherein the short stop is neodecanoic acid.

6. The recovery process of claim 1 wherein a lithium initiator is used in the polymerization process, the short stop is neodecanoic acid, and the molar amount of neodecanoic acid to lithium is about 1.5.

7. The recovery process of claim 1 wherein in the catalyst wash step water is present in the amount of 5–100% of the amount of cement, the cement is intensively agitated, and a water soluble acid is added as required to maintain pH in the range of from about 3 to about 7.

8. A product of an anionic polymerization process wherein said polymer is removed by a process with a shortstop addition step, a catalyst wash step, an anti-oxidant addition step, a coagulation step, and control of pH in the range of about 6 to about 7 during said catalyst wash step and said coagulation step, and wherein said shortstop addition step is the addition of an organic acid of formula R—COOH, where R is an organic moiety and said anti-oxidant is hindered phenol and epoxidized soya bean oil, said hindered phenol containing by-products that have not been removed and that without the addition of epoxidized soya bean oil would produce a colored product.

9. A product of an anionic polymerization process wherein said polymer is removed by a process with a shortstop addition step, a catalyst wash step, an anti-oxidant addition step, a coagulation step, and control of pH in the range of about 6 to about 7 during said catalyst wash step and said coagulation step, and wherein said shortstop addition step is the addition of an organic acid of formula R—COOH, where R is an organic moiety and said anti-oxidant a hindered phenol purified using epoxidized soya bean oil.

10. A product of an anionic polymerization process according to claim 8 wherein the inorganic acid in the short stop addition is neodecanoic acid.

11. The recovery process according to claim 4, wherein the short stop is an organic acid of formula R—COOH, wherein R is a $C_3$–$C_{30}$ moiety.

12. The recovery process according to claim 11, wherein R is a $C_3$–$C_{20}$ moiety.

13. The recovery process according to claim 12, wherein R is a $C_3$–$C_{15}$ moiety.

14. The recovery process according to claim 1, wherein the catalyst wash step water is present in the amount of 5–50% of the amount of cement.

15. The recovery process of claim 14, wherein the catalyst wash step water is present in the amount of 5–25% of the amount of cement.

16. The recovery process of claim 7, wherein said pH ranges from about 6 to 7.

17. The product according to claim 8, wherein the short stop addition step is the addition of an organic acid of formula R—COOH, wherein R is a $C_3$–$C_{30}$ moiety.

18. The product according to claim 17, wherein R is a $C_3$–$C_{20}$ moiety.

19. The product according to claim 18, wherein R is a $C_3$–$C_{15}$ moiety.

20. The product according to claim 9, wherein the short stop addition step is the addition of an organic acid of formula R—COOH, wherein R is a $C_3$–$C_{30}$ moiety.

21. The product according to claim 20, wherein R is a $C_3$–$C_{20}$ moiety.

22. The product according to claim 21, wherein R is a $C_3$–$C_{15}$ moiety.

* * * * *